(12) United States Patent
Zhamu et al.

(10) Patent No.: US 11,767,221 B2
(45) Date of Patent: Sep. 26, 2023

(54) PRODUCTION OF GRAPHENE SHEETS FROM HIGHLY AROMATIC MOLECULES

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 197 days.

(21) Appl. No.: 15/894,234

(22) Filed: Feb. 12, 2018

(65) Prior Publication Data
US 2019/0077668 A1    Mar. 14, 2019

Related U.S. Application Data

(63) Continuation-in-part of application No. 15/700,756, filed on Sep. 11, 2017, now Pat. No. 10,526,204.

(51) Int. Cl.
*C01B 32/184*    (2017.01)
*B82Y 30/00*    (2011.01)
*B82Y 40/00*    (2011.01)

(52) U.S. Cl.
CPC .......... *C01B 32/184* (2017.08); *B82Y 30/00* (2013.01); *B82Y 40/00* (2013.01); *C01B 2204/02* (2013.01); *C01B 2204/04* (2013.01); *C01B 2204/32* (2013.01); *Y10S 977/734* (2013.01); *Y10S 977/842* (2013.01); *Y10S 977/845* (2013.01)

(58) Field of Classification Search
CPC .......... C01B 32/184; C01B 2204/04; C01B 2204/32; B82Y 30/00; B82Y 40/00; Y10S 977/842; Y10S 977/845
See application file for complete search history.

(56) References Cited

U.S. PATENT DOCUMENTS

| | | |
|---|---|---|
| 2,798,878 A | 7/1957 | Hummers |
| 6,872,330 B2 | 3/2005 | Mack et al. |
| 7,071,258 B1 | 7/2006 | Jang et al. |
| 7,327,000 B2 | 2/2008 | DeHeer et al. |
| 8,883,114 B2 | 11/2014 | Zhamu et al. |

(Continued)

OTHER PUBLICATIONS

Smerieri, Marco, et al. "Synthesis of graphene nanoribbons with a defined mixed edge-site sequence by surface assisted polymerization of (1,6)—dibromopyrene on Ag (110)." Nanoscale 8.41 (2016): 17843-17853.*

(Continued)

*Primary Examiner* — Richard M Rump (57) ABSTRACT

Provided is a method of producing isolated graphene sheets directly from a carbon/graphite precursor. The method comprises: (a) providing a mass of halogenated aromatic molecules selected from halogenated petroleum heavy oil or pitch, coal tar pitch, polynuclear hydrocarbon, or a combination thereof; (b) heat treating this mass at a first temperature of 25 to 300° C. in the presence of a catalyst and optionally at a second temperature of 300-3,200° C. to form graphene domains dispersed in a disordered matrix of carbon or hydrocarbon molecules, and (c) separating and isolating the planes of hexagonal carbon atoms or fused aromatic rings to recover graphene sheets from the disordered matrix.

17 Claims, 3 Drawing Sheets

(56) References Cited

U.S. PATENT DOCUMENTS

| 2013/0180581 A1* | 7/2013 | Choi | H05B 33/28 |
| | | | 136/256 |
| 2015/0235741 A1 | 8/2015 | Sumi et al. | |
| 2017/0037257 A1 | 2/2017 | Yang et al. | |

OTHER PUBLICATIONS

PCT/US18/49825 International Search Report and Written Opinion dated Nov. 5, 2018, 9 pages.
U.S. Appl. No. 15/700,756 Nonfinal Office Action dated Oct. 12, 2018, 7 pages.
Anderson et al., "The Use of Esters of N-Hydroxysuccinimide in Peptide Synthesis" J. Amer. Chem. Soc. (1964) vol. 86, No. 9, pp. 1839-1842.
Hummers, "Preparation of graphitic oxide" J. Am. Chem. Soc. (1958) vol. 80, p. 1339.
Jang et al., "Processing of Nano Graphene Platelets (NGPs) and NGP Nanocomposites: A Review" J. Materials Sci. (2008) vol. 43, pp. 5092-5101.
Yang et al., "Two-dimensional Graphene Nano-ribbons" J. Am. Chem. Soc. (2008) vol. 130, pp. 4216-4217.

\* cited by examiner

PRODUCTION OF GRAPHENE SHEETS FROM HIGHLY AROMATIC MOLECULES

This application is a continuation-in-part of U.S. patent application Ser. No. 15/700,756, filed Sep. 11, 2017, the contents of which are incorporated by reference herein, in their entirety, for all purposes.

FIELD OF THE INVENTION

The present disclosure relates to the art of graphene materials and, in particular, to a method of rapidly producing isolated graphene sheets in an environmentally benign manner from aromatic hydrocarbon molecules.

BACKGROUND

A single-layer graphene sheet is composed of an atomic plane of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. Herein, NGPs include pristine graphene (essentially 99% of carbon atoms), slightly oxidized graphene 5% by weight of oxygen), graphene oxide (≥5% by weight of oxygen), slightly fluorinated graphene 5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was the first to discover graphene as early as 2002 [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Our research has yielded a process for rapid, cost-effective, and environmentally benign production of isolated graphene sheets. The process is novel in that is does not follow the established methods for production of nano graphene platelets outlined below. Four main prior-art approaches have been followed to produce NGPs. Their advantages and shortcomings are briefly summarized as follows:

Approach 1: Chemical Formation and Reduction of Graphite Oxide (GO)

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_a = \frac{1}{2} d_{002} = 0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.
(2) The chemical treatment process requires a long intercalation and oxidation time, typically 5 hours to five days.
(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.
(4) The thermal exfoliation requires a high temperature (typically 800-1,200° C.) and, hence, is a highly energy-intensive process.
(5) Both heat- and solution-induced exfoliation approaches require a very tedious washing and purification step. For instance, typically 2.5 kg of water is used to wash and recover 1 gram of GIC, producing huge quantities of waste water that need to be properly treated.
(6) In both the heat- and solution-induced exfoliation approaches, the resulting products are GO platelets that must undergo a further chemical reduction treatment to reduce the oxygen content. Typically, even after reduction, the electrical conductivity of GO platelets remains much lower than that of pristine graphene. Furthermore, the reduction procedure often involves the utilization of toxic chemicals, such as hydrazine.

(7) Furthermore, the quantity of intercalation solution retained on the flakes after draining may range from 20 to 150 parts of solution by weight per 100 parts by weight of graphite flakes (pph) and more typically about 50 to 120 pph. During the high-temperature exfoliation, the residual intercalate species retained by the flakes decompose to produce various species of sulfuric and nitrous compounds (e.g., $NO_x$ and $SO_x$), which are undesirable. The effluents require expensive remediation procedures in order not to have an adverse environmental impact.

The present disclosure was made to overcome the limitations outlined above.

Approach 2: Formation of Pristine Graphene

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present disclosure was made to overcome the limitations outlined above.

Approach 3: Epitaxial Growth and Chemical Vapor Deposition of Graphene on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene (DITB) with 4-bromophenylboronic acid (BBA). The resulting hexaphenylbenzene derivative was further derivatized and ring-fused into small graphene sheets. This is a slow process that thus far has produced very small graphene sheets. This approach has extremely limited scope of application—only coupling between DITB and BBA works. No other chemical species were found to follow this synthesis route. The present disclosure was made to overcome the limitations outlined above.

Hence, an urgent need exists for a graphene production process that requires a reduced amount of undesirable chemical (or elimination of these chemicals all together), shortened process time, less energy consumption, lower degree of graphene oxidation, reduced or eliminated effluents of undesirable chemical species into the drainage (e.g., sulfuric acid) or into the air (e.g., $SO_2$ and $NO_2$). The process should be able to produce more pristine (less oxidized and less damaged), more electrically conductive, and larger/wider graphene sheets.

SUMMARY OF THE INVENTION

The present disclosure provides a strikingly simple, fast, scalable, environmentally benign, and cost-effective process or method that meets the afore-mentioned needs. This method is capable of producing single-layer or few layer graphene directly from a precursor to carbon or graphite (referred to as a carbon/graphite precursor). In certain embodiments, the disclosed method disrupts, interrupts, and/or stops the graphitization or even carbonization procedures of highly aromatic molecules or polycyclic aromatic hydrocarbons (PAH).

In some embodiments, this disclosure provides a method of producing isolated graphene sheets (directly from a graphite precursor). This method comprises: (a) providing a mass of halogenated aromatic molecules in a liquid, solid, or semi-solid state wherein the halogenated aromatic molecules are selected from the halogenated versions of petroleum heavy oil or pitch, coal tar pitch, a polynuclear hydrocarbon, or a combination thereof; (b) heat treating this mass of halogenated aromatic molecules at a first temperature selected from 25° C. to 3,000° C. so that the halogenated aromatic molecules are merged or fused into larger aromatic molecules and optionally heat-treating the larger molecules at a second temperature (higher than the first temperature) selected from 300° C. to 3,200° C. to form graphene domains dispersed in a disordered matrix of carbon or hydrocarbon molecules, wherein the graphene domains are each composed of from 1 to 30 planes of hexagonal carbon atoms or fused aromatic rings having a length or width from 4 nm to 100 µm (more typically 5 nm to 35 µm) and, in the situations wherein there are 2-30 planes in a graphene domain, an inter-graphene space between two planes of hexagonal carbon atoms or fused aromatic rings no less than 0.34 nm; and (c) separating and isolating the planes of hexagonal carbon atoms or fused aromatic rings to recover graphene sheets from the disordered matrix.

In certain situations, the graphene domains can contain up to 40 graphene planes (e.g. when the final heat treatment temperature is relatively high, >1,500° C.), but preferably and typically up to 20 planes only. During the recovery process, graphene domains having up to 30 graphene planes can be separated into graphene platelets having less than 10 graphene planes per platelet; e.g. if under ultrasonication or high shear (typically having a shear rate from 1 to 5,000 $sec^{-1}$). These mechanical treatments may be applied to the mass of PAHs not only during heat treatments, but also during the subsequent isolation (e.g. solvent extraction) procedure.

Halogen herein refers to F, Cl, Br, I, or a combination thereof. The halogen atoms in the halogenated aromatic molecules are preferably attached to a carbon atom at the edge of a fused benzene ring-type structure. The halogen atoms are preferably not part of the fused benzene ring structure.

Preferably, the halogenated polynuclear hydrocarbon is selected from halogenated versions of naphthalene, anthracene, phenanthrene, tetracene, chrysene, triphenylene, pyrene, pentacene, benzo-pyrene, corannulene, benzo-perylene, coronene, ovalene, benzo-fluorene, a derivative thereof having a substituent on a ring structure thereof, a chemical derivative thereof, or a combination thereof.

The halogenation of aromatic molecules is well known in the art. For instance, halogenation of anthracene may be accomplished by following the approaches proposed by Duan, et a. [Duan, Turk, Speigle, Corbin, Masnovi and Baker, Halogenations of Anthracenes and Dibenz[a,c]anthracene with N-Bromosuccinimide and N-Chlorosuccinimide, The Journal of Organic Chemistry, 2000 65 (10), pp 3005-3009]. For instance, The first heat treatment of the mass of halogenated aromatic molecules at a first temperature selected from 25° C. to 3,000° C. (typically <1,500° C.) allow the halogenated aromatic molecules are merged or fused into larger aromatic molecules. For instance, 2 or 3 adjacent halogenated aromatic molecules can be merged into one giant molecule, larger than the 2 or 3 original participating molecules. The second heat treatment at a higher temperature (from 300° C. to 3,200° C.) serves to chemically transform the merged aromatic molecules (merged pitches or polynuclear hydrocarbon molecules are further fused and organized) into "graphene domains" that are often or typically dispersed in or connected to a disordered matrix of carbon or hydrocarbon molecules. The matrix is characterized by having amorphous and defected areas of carbon or hydrocarbon molecules. These graphene domains (yet to be isolated or separated) can include individual single planes of hexagonally arranged carbon atoms ("graphene planes") or multiple graphene planes (2-20 hexagonal carbon planes stacked together) that are embedded in or connected to disordered or defected areas of carbon or hydrocarbon molecules, which can contain other atoms (such as N, S, etc.) than C, O, and H.

Typically, the graphene domains formed during the heat treatment have a length or width from 10 nm to 10 μm or an inter-graphene space no less than 0.4 nm. In certain embodiments, the graphene domains have an inter-graphene space from 0.5 nm to 2.0 nm. In some embodiments, the graphene domains have a length or width from 15 nm to 2 μm.

The recovered graphene sheets typically comprise single-layer graphene, double-layer graphene, or triple-layer graphene sheets. In many cases, the graphene sheets produced contain at least 80% single-layer graphene or at least 80% few-layer graphene having no greater than 10 graphene planes.

The graphene sheets produced by using the presently disclosed method can contain pristine graphene, oxidized graphene with less than 5% oxygen content by weight, graphene fluoride, graphene fluoride with less than 5% fluorine by weight, graphene with a carbon content no less than 95% by weight, or chemically modified graphene.

In the disclosed method, the first heat treatment is typically conducted at a temperature selected from a range of 25° C. to 3,200° C., preferably from 25° C. to 2,500° C., more preferably from 30° C. to 1,500° C., and most preferably from 100° C. to 1,200° C.

In the disclosed method, chemical means and/or mechanical means are found to be surprisingly effective in promoting more uniform dispersion of individual graphene planes (for reduced stacking of graphene planes along the plane thickness direction) and in preventing close stacking (compacting) of graphene planes in the graphene domains along the thickness direction, if/when stacking of several graphene planes occurs.

The chemical means include functionalizing or derivatizing at least one of the planes of hexagonal carbon atoms or fused aromatic rings. These planes are incipient of or precursor to graphene planes. Chemical functional groups at the edge or on the plane surface of such incipient planes prevent close stacking of these planes.

The mechanical means include exposing said mass of aromatic molecules to a gaseous environment, flowing fluid, sonic waves, mechanical shearing, or a combination thereof. The mechanical means serve to randomize the dispersion and orientation of graphene planes in the mass of aromatic molecules being heat-treated.

In certain embodiments, the step of separating and isolating graphene sheets includes solvent extraction or supercritical fluid extraction of the planes of hexagonal carbon atoms or fused aromatic rings from the disordered matrix to form the graphene sheets. The supercritical fluid may include carbon dioxide.

In certain embodiments, step (c) includes an operation of dissolving, melting, etching, vaporizing, subliming, burning off, or ultrasonicating the disordered matrix material for separating the graphene sheets.

Another surprising and highly advantageous feature of the presently disclosed process is the notion that graphene sheet production and chemical functionalization can be accomplished concurrently. Desired functional groups can be imparted to graphene edges and/or surfaces, provided that selected chemical species (functionalizing agents) containing desired chemical function groups (e.g. —$NH_2$, Br—, etc.) are dispersed or dissolved in the reacting mass of aromatic molecules being heat-treated. Chemical functionalization reactions can occur in situ as soon as the reactive sites or active radicals are formed.

In some embodiments, functionalizing agents contain a chemical functional group selected from alkyl or aryl silane, alkyl or aralkyl group, hydroxyl group, carboxyl group, amine group, sulfonate group (—$SO_3H$), aldehydic group, quinoidal, fluorocarbon, or a combination thereof.

In certain embodiments, the functionalizing agent contains an azide compound selected from the group consisting of 2-Azidoethanol, 3-Azidopropan-1-amine, 4-(2-Azidoethoxy)-4-oxobutanoic acid, 2-Azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups, and combinations thereof.

In certain embodiments, the functionalizing agent contains an oxygenated group selected from the group consisting of hydroxyl, peroxide, ether, keto, and aldehyde. In certain embodiments, the functionalizing agent contains a functional group selected from the group consisting of $SO_3H$, COOH, $NH_2$, OH, R'CHOH, CHO, CN, COCl, halide, COSH, SH, COOR', SR', $SiR'_3$, $Si(-OR'-)_yR'_{3-y}$, $Si(-O-SiR'_2-)OR'$, R'', Li, $AlR'_2$, Hg-X, $TlZ_2$ and Mg-X; wherein y is an integer equal to or less than 3, R' is hydrogen, alkyl, aryl, cycloalkyl, or aralkyl, cycloaryl, or poly(alkylether), R'' is fluoroalkyl, fluoroaryl, fluorocycloalkyl, fluoroaralkyl or cycloaryl, X is halide, and Z is carboxylate or trifluoroacetate, and combinations thereof.

The functionalizing agent may contain a functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof. The functionalizing agent may contain an acrylonitrile chain, polyfurfuryl alcohol, phenolic resin, or a combination thereof.

In some embodiments, the functionalizing agent contains a functional group selected from OY, NHY, O=C-OY, P=C-NR'Y, O=C-SY, O=C-Y, -CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'-OH, $R'-NR'_2$, R'SH, R'CHO, R'CN, R'X, $R'N^+(R')_3X^-$, $R'SiR'_3$, $R'Si(-OR'-)_yR'_{3-y}$, $R'Si(-O-SiR'_2-)OR'$, R'-R'', R'-N-CO, $(C_2H_4O-)_wH$, $(C_3H_6O)_w-R'$, R', and w is an integer greater than one and less than 200.

In certain embodiments of the present disclosure, the method of producing isolated graphene sheets from a graphite precursor comprises: (A) halogenating a mass of aromatic molecules in a liquid, solid, or semi-solid state to form a mass of halogenated aromatic molecules wherein the aromatic molecules are selected from petroleum heavy oil or pitch, coal tar pitch, a polynuclear hydrocarbon, or a combination thereof; (B) heat treating the mass of halogenated aromatic molecules in the presence of a catalyst at a first temperature from 25° C. to 1,500° C. to form graphene domains dispersed in a disordered matrix of carbon or hydrocarbon molecules, wherein the graphene domains are each composed of one or a plurality of planes of hexagonal carbon atoms or fused aromatic rings having a length or width from 5 nm to 100 μm; and (C) separating and isolating the planes of hexagonal carbon atoms or fused aromatic rings to recover graphene sheets from the disordered matrix.

The polynuclear hydrocarbon is selected from naphthalene, anthracene, phenanthrene, tetracene, chrysene, triphenylene, pyrene, pentacene, benzo-pyrene, corannulene, benzo-perylene, coronene, ovalene, benzo-fluorene, a derivative thereof having a substituent on a ring structure thereof, a chemical derivative thereof, or a combination thereof.

In this method, chemical means or mechanical means is not required for use (but, may be used) in regulating the clustering and stacking of graphene planes during the initiation and growth of graphene planes or domains. However, a catalyst is needed during the first heat treatment.

Preferably, the catalyst contains a transition metal selected from Ti, V, Cr, Mn, Fe, Co, Ni, Cu, Zn, Zr, Nb, Mo, Ru, Pd, Ag, Cd, Pt, Au, or a combination thereof. In some embodiments, the catalyst contains a chemical species selected from $PdCl_2$, $FeCl_3$, $FeBr_3$, $FeF_3$, $NiBr_2$, $NiI_2$, $Cs_2CO_3$, CsF, CsCl, CsBr, $CH_2CL_2$, or a combination thereof.

In certain embodiments, step (b) further includes heat-treating the graphene domains at a second temperature selected from 300° C. to 3,200° C. for at least 0.5 hours prior to step (c). This is more typically from 1 to 96 hours, but still more typically from 2 to 48 hours.

DETAILED DESCRIPTION OF PREFERRED EMBODIMENTS

Carbon materials can assume an essentially amorphous structure (glassy carbon), a highly organized crystal (graphite), or a wide range of intermediate structures that are characterized in that various proportions and sizes of graphite crystallites and defects are dispersed in an amorphous carbon matrix. Typically, a graphite crystallite is composed of multiple graphene planes (planes of hexagonal structured carbon atoms or basal planes) that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a natural graphite flake, artificial graphite bead, carbon/graphite fiber segment, carbon/graphite whisker, or carbon/graphite nanofiber.

One embodiment of the present disclosure is a method of producing isolated/separated graphene sheets or nano graphene platelet (NGP). A NGP is essentially composed of a graphene plane (hexagonal lattice of carbon atoms) or multiple graphene planes stacked and bonded together (typically up to 10 graphene planes per multi-layer platelet). Each graphene plane, also referred to as a graphene sheet, comprises a two-dimensional hexagonal structure of carbon atoms. Each platelet has a length and a width parallel to the graphene plane and a thickness orthogonal to the graphene plane. By definition, the thickness of an NGP can be 100 nanometers (nm) or smaller (preferably containing no greater than 10 hexagonal planes), with a single-sheet NGP, also referred to as single-layer graphene, being as thin as 0.34 nm.

Currently, the most commonly used method of graphene production is the so-called chemical method, referred to in the Background section as "Approach 1: Chemical Formation and Reduction." This method entails chemical intercalation or oxidation of natural graphite or synthetic graphite particles. These particles are essentially already in the fully graphitized state. Prior to intercalation or oxidation, the graphite particle has an inter-graphene plane spacing as small as approximately 0.335 nm ($L_a = \frac{1}{2} d_{002} = 0.335$ nm). Due to the short-range force nature of van der Waals forces, the bonding between graphene planes is very strong, making it difficult for any chemical species to intercalate into the inter-graphene spaces. Hence, it normally takes a combination of a strong acid (e.g. sulfuric acid) and a strong oxidant (e.g. potassium permanganate or nitric acid) and a long reaction time to achieve full chemical intercalation or oxidation of graphite to produce the graphite intercalation compound (GIC) or graphite oxide (GO). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water to produce graphene sheets.

As such, this prior art Approach 1 basically entails three distinct procedures: first expansion (oxidation or intercalation), further expansion (or "exfoliation"), and separation. As stated in the Background section, this approach has 7 major deficiencies: (a) The process requires the use of large quantities of several undesirable chemicals; (b) The chemical treatment process requires a long intercalation and oxidation time; (c) Strong acids consume a significant amount of starting graphite material; (d) The process is a highly energy-intensive process; (e) The approach requires a very tedious washing and purification step; (f) The resulting products are GO platelets that must undergo a further chemical or thermal reduction treatment to reduce the oxygen content; and (g) The process can induce negative environmental impact.

The present disclosed provides a brand-new method of producing graphene sheets (single-layer or few layer graphene having 1-10 layers) from aromatic molecules without forming a graphite (no conventional carbonization and no graphitization treatments). This strikingly simple and elegant process avoids all the afore-mentioned 7 problems associated with the chemical method of graphene production.

Figure 3:
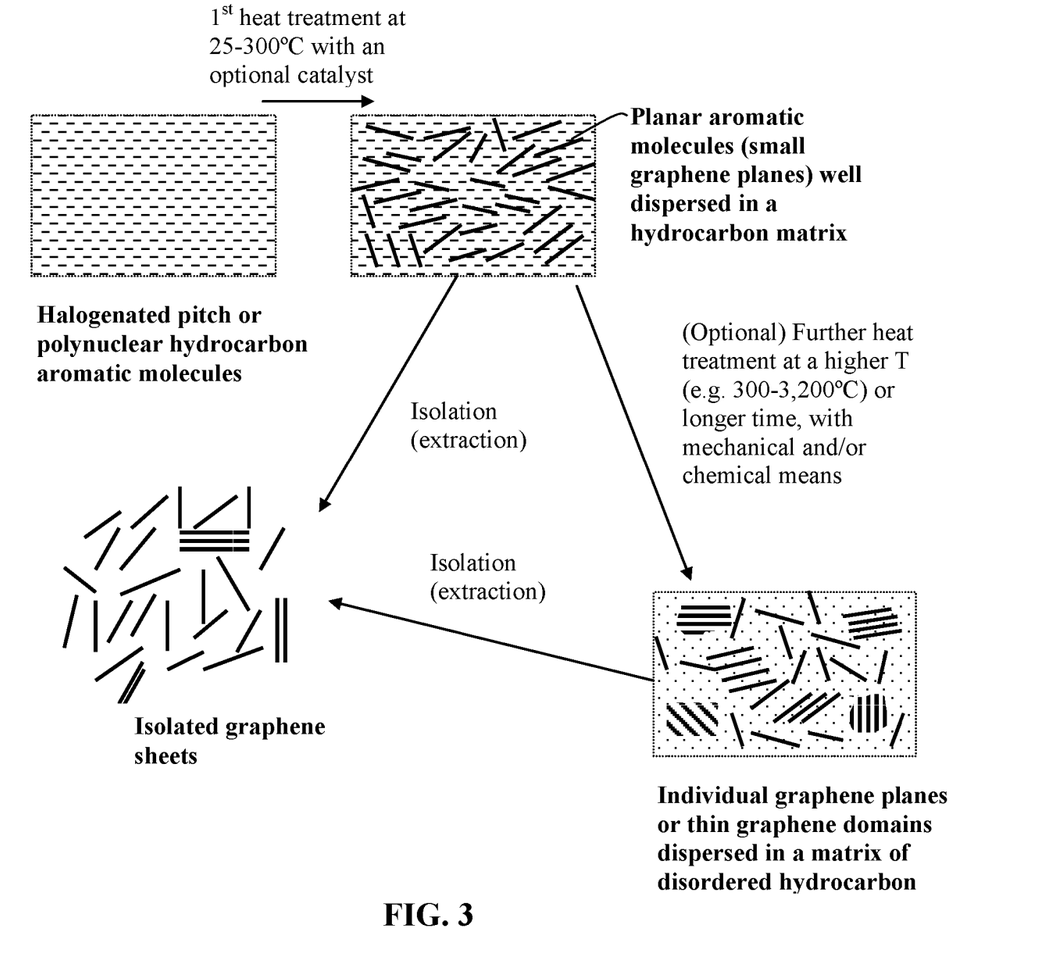
FIG. 3 A flow chart showing the presently disclosed process for producing isolated graphene sheets directly from graphite precursor.

In certain preferred embodiments, as illustrated in FIG. 3, the disclosed method of producing isolated graphene sheets (directly from a graphite precursor) comprises: (a) providing a mass of halogenated aromatic molecules in a liquid, solid, or semi-solid state wherein the halogenated aromatic molecules are selected from the halogenated versions of petroleum heavy oil or pitch, coal tar pitch, a polynuclear hydrocarbon, or a combination thereof; (b) heat treating this mass of halogenated aromatic molecules (optionally in the presence of a catalyst) and preferably also using chemical or mechanical means to form graphene domains dispersed in a disordered matrix of carbon or hydrocarbon molecules, wherein the graphene domains are each composed of from 1 to 30 planes of hexagonal carbon atoms or fused aromatic rings having a length or width from 4 nm to 100 μm (more typically from 5 nm to 35 μm) and, in the situations wherein there are 2-30 planes in a graphene domain, an inter-graphene space between two planes of hexagonal carbon atoms or fused aromatic rings no less than 0.4 nm (typically from 0.5 nm to 2.0 nm); and (c) separating and isolating the planes of hexagonal carbon atoms or fused aromatic rings to recover graphene sheets from the disordered matrix.

The catalyst preferably contains a transition metal selected from Ti, V, Cr, Mn, Fe, Co, Ni, Cu, Zn, Zr, Nb, Mo, Ru, Pd, Ag, Cd, Pt, Au, or a combination thereof. In certain preferred embodiments, the catalyst contains a chemical species selected from $PdCl_2$, $FeCl_3$, $FeBr_3$, $FeF_3$, $NiBr_2$, $NiI_2$, $Cs_2CO_3$, CsF, CsCl, CsBr, $CH_2CL_2$, or a combination thereof.

The graphene sheets or NGPs produced with the instant method are mostly single-layer graphene (in some cases, with some few-layer graphene sheets (up to 10 layers). The length and width of a NGP are typically from 4 nm to 100 μm, but more typically from 5 nm to 35 μm, and most typically from 10 nm to 10 μm. These graphene sheets that are produced using the presently disclosed method are typically much longer and wider than those produced by the conventional Hummer's method.

Polynuclear hydrocarbons (also referred to as polycyclic aromatic hydrocarbons, PAHs, polyaromatic hydrocarbons, or polynuclear aromatic hydrocarbons) are hydrocarbons (organic compounds containing mostly carbon and hydrogen) that are essentially composed of multiple aromatic rings fused together (fused organic rings in which the electrons are delocalized). Prior to the first heat treatment, the starting PAHs contain mostly or substantially all fused rings (e.g. chlorinated anthracene). Although not preferred, the starting aromatic materials in the instant process may be selected from those containing isolated benzene rings that are connected by a linear chain or bond (e.g. 2'-chloro-1,1': 4',1"-terphenyl). Herein, PAHs include those having further branching substituents on these ring structures. The simplest of such chemicals are naphthalene, having two aromatic rings, and the three-ring compounds anthracene and phenanthrene. Briefly, examples of halogenated PAHs are halogenated versions of naphthalene, anthracene, phenanthrene, tetracene, chrysene, triphenylene, pyrene, pentacene, benzo-pyrene, corannulene, benzo-perylene, coronene, ovalene, and benzo-fluorene. PAHs of interest here typically have from 2 to 20 aromatic rings (approximately 10 to 60 carbon atoms) fused together, more typically from 2 to 10 rings (approximately 10 to 32 carbon atoms). However, they can have a larger number of fused rings or fused polycyclic aromatics.

Petroleum- or coal-derived pitch is a mixture of larger polynuclear hydrocarbons with an average molecular weight of approximately 200 amu (approximately 180-200 carbon atoms or 60-66 rings). Each pitch product is a mixture of many different types and sizes of polynuclear hydrocarbons. There are also a variety of impurities (1-10% by weight) in such pitch materials. In contrast, those PAHs mentioned above are substantially impurity-free.

In some embodiments, the disclosed method begins with heat-treating a high-purity (>99%) halogenated polycyclic aromatic hydrocarbon (PAH) or a mixture of several pure PAHs at a first temperature selected from the range of 30° C. to 3,000° C. (most preferably from 30° C. to 300° C.) to facilitate fusion or chemical merging of polycyclic aromatics to form larger (longer and/or wider PAH). In certain embodiments, the larger PAHs were subjected to a second heat treatment at a second heat treatment temperature (higher than the first temperature) selected from 300° C. to 3,200° C. (preferably from 300° C. to 1,500° C.). In some preferred embodiments, the heat treatments include a first heat treatment temperature preferably in the range of 30° C. to 300° C. for a heat treatment time of preferably 0.2 to 24 hours. This is followed by a second heat treatment at a second temperature from 300° C. to 1,500° C. for preferably 0.2 to 24 hours.

At the first heat treatment temperature of 150° C. to 300° C., the PAHs can undergo dehydrogenation polymerization that entails removal of non-carbon atoms, such as Cl, Br, H and N, and lateral merging of fused aromatic rings to form longer and wider aromatic molecules (polyaromatic molecules) or more aromatic rings fused together in the length and width directions, much like growing polymer chains. Such a structure of fused aromatic rings can grow to contain up to 300 carbon atoms or approximately 100 rings fused together. Such a structure is an incipient graphene sheet.

At a second heat treatment temperature selected from 300° C. to 1,500° C., these incipient graphene sheets continue to grow in lateral dimensions (length and width) which can reach several micrometers (0.5-100 μm and more typically 1-10 μm) and the resulting graphene sheets can each contain many thousands of fused rings. These dimensions and number of fused rings can be determined by using transmission electron microscopy (TEM) and atomic force microscopy (AFM).

As the polyaromatic molecules grow at a heat treatment temperature, the cohesive energy between polyaromatic molecules can eventually exceed the translational energy of individual polyaromatic molecules, resulting in the homogeneous nucleation of a new phase, called the mesophase. The polyaromatic molecules that constitute the mesophase are discotic, with one axis much smaller than the other two axes. These planar molecules can arrange themselves with the planes parallel to each other, forming nematic liquid crystals. The growing liquid crystal phase adopts a spherical shape to minimize surface energy. Thus, the mesophase creates microbeads, which could have diameters up to 100 μm.

Figure 2:
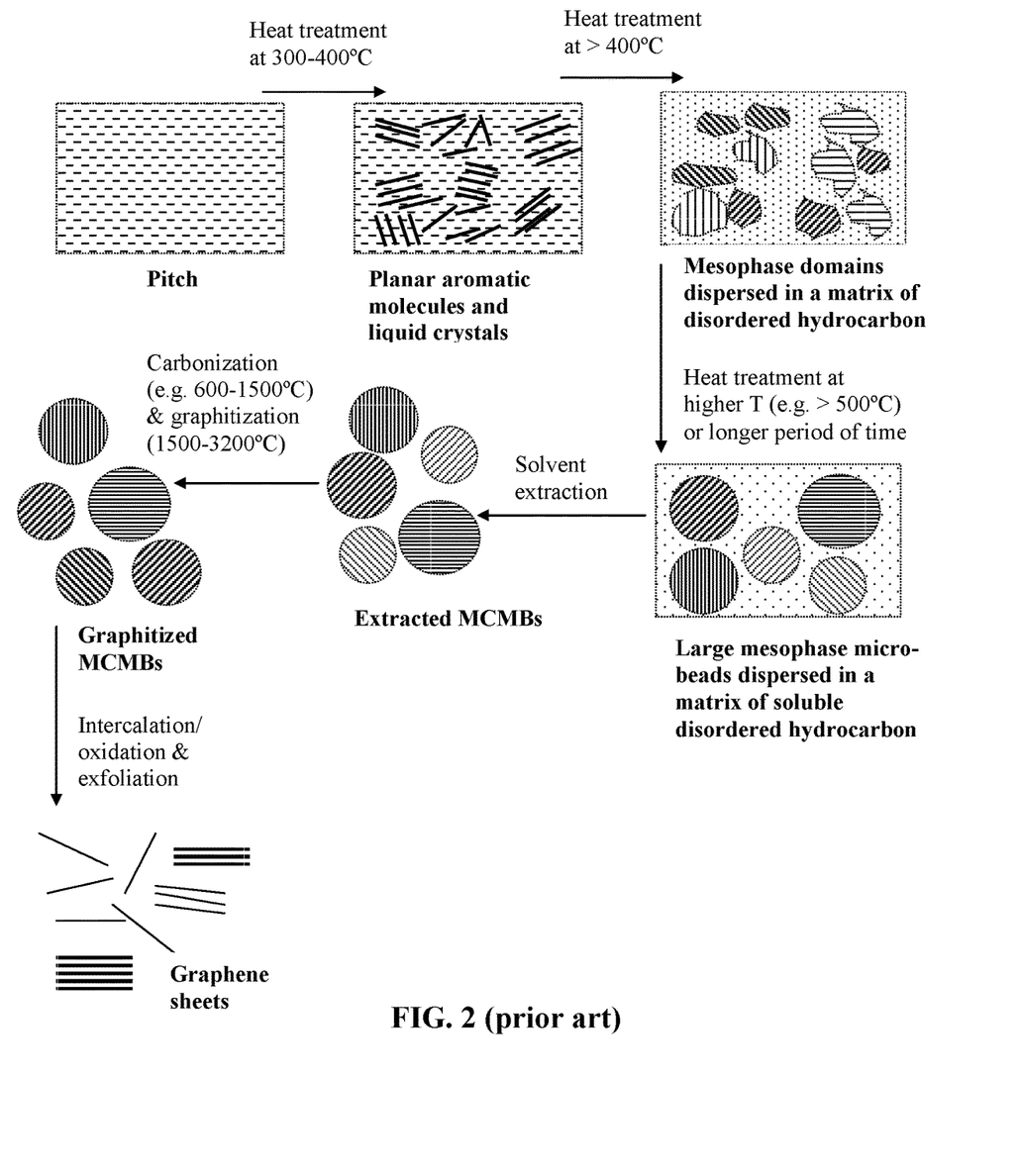
FIG. 2 A flow chart showing a prior art process that entails heat-treating halogenated petroleum or coal tar pitch at 300-400° C. to produce planar aromatic molecules, heating the planar aromatic molecules at >400° C. to produce mesophase domains, further heating to produce mesophase spheres dispersed in a disordered hydrocarbon matrix, extracting the mesophase spheres to produce extracted meso-carbon micro-beads (extracted MCMBs or "green" MCMBs), carbonizing and graphitizing extracted MCMBs to produce (graphitized) MCMBs, chemically intercalating or oxidizing MCMBs to produce GIC or GO, thermally or mechanically exfoliate GIC or GO to produce graphite worms, and mechanically shearing the graphite worms to produce isolated graphene sheets.

FIG. 2 shows a prior art process that entails heat-treating petroleum or coal tar pitch at 300-400° C. to produce planar aromatic molecules, heating the planar aromatic molecules at >400° C. to produce mesophase domains, further heating to produce mesophase spheres dispersed in a disordered hydrocarbon matrix, extracting the mesophase spheres to produce extracted meso-carbon micro-beads (extracted or "green" MCMBs), carbonizing and graphitizing extracted MCMBs to produce (graphitized) MCMBs, chemically intercalating or oxidizing MCMBs to produce GIC or GO, thermally or mechanically exfoliate GIC or GO to produce graphite worms, and mechanically shearing the graphite worms to produce isolated graphene sheets. This is again a tedious, energy intensive, and chemical intensive process.

After extensive and in-depth studies, we have come to observe that, surprisingly, the formation of mesophase crystals or micro-beads can be interrupted or disrupted by using selected mechanical means and/or chemical means. In the disclosed method, chemical means and/or mechanical means are effective in promoting more uniform dispersion of individual graphene planes (for reduced aggregating and reduced stacking of graphene planes along the plane thickness direction) and in preventing close stacking (compacting) of graphene planes in the graphene domains along the thickness direction, if/when stacking of multiple graphene planes occurs. Without the mechanical means and chemical means, the inter-graphene spacing in graphene domains is typically much smaller than 0.4 nm, even smaller than 0.34 nm. With the mechanical or chemical means being implemented during the heat treatments, the inter-graphene spacing in graphene domains (if present) is typically greater than 0.4 nm, more typically from 0.5 nm to 2.3 nm, and most typically from 0.6 nm to 1.5 nm. Reduced aggregation (clustering) and reduced close-stacking of graphene planes in a hydrocarbon mass would make it easier to isolate and recover individual graphene sheets from a matrix of other chemical species.

The chemical means include functionalizing or derivatizing at least one of the planes of hexagonal carbon atoms or fused aromatic rings. These planes are incipient or precursor to graphene planes. Chemical functional groups at the edge or on a plane surface of such incipient planes prevent close stacking of these planes.

The mechanical means include exposing the mass of aromatic molecules to a gaseous environment, flowing fluid, sonic waves, mechanical shearing, or a combination thereof. The mechanical means serve to randomize the dispersion and orientation of graphene planes in the mass of aromatic molecules being heat-treated. These actions interrupt or disrupt the aggregation and close stacking of graphene planes, reducing the number of graphene planes in a graphene domain (if present) to be less than 20 (typically less than 10 and more typically 1-5 planes). Consequently, the subsequent extraction or isolation means produce most single-layer or few-layer graphene sheets.

In certain embodiments, the disclosed process begins with a petroleum pitch or coal tar pitch. Upon heating to approximately 200° C., pitch becomes fluid or gets melted. In the melt, the translational energy afforded to molecules by the temperature overcomes the cohesion energy. However, at a higher temperature (e.g., >300° C.), dehydrogenation polymerization reactions occur, causing average molecular weight to increase, which can reach 600-900 amu (approximately 200-300 rings fused together) when the temperature exceeds 400° C.

As the molecules grow, without external disturbance, the cohesive energy exceeds the translational energy, resulting in the homogeneous nucleation of a mesophase. The polyaromatic molecules that constitute the mesophase pitch are discotic, with one axis much smaller than the other two axes. Again, these molecules can arrange themselves with the planes parallel to each other, forming nematic liquid crystals. The growing liquid crystal phase adopts a spherical shape to minimize surface energy. Thus, the mesophase creates microbeads, which could grow to have diameters up to 100 μm.

Again, we have found that mechanical means and chemical means can disrupt/interrupt the measophase crystal- or microbead-forming process. As a result, we can more easily and readily isolate/recover individual graphene sheets or thin graphene domains (having less than 10 graphene planes) from the matrix of disordered hydrocarbon material.

In graphite industry, the microbead-producing process begins with utilization of petroleum heavy oil pitch, coal tar pitch, or oil sand. When the pitch is carbonized by a heat treatment at 400 to 500° C., micro-crystals called mesophase micro-spheres are formed in the heat-treated pitch. These mesophase micro-spheres are liquid crystals having a characteristic molecular arrangement that can be converted into highly crystalline carbonized products by subjecting them to a further heat treatment. These mesophase micro-spheres (typically insoluble), after being isolated from other (soluble) components of the heat-treated pitch, are often referred to as meso-carbon microbeads (MCMB), mesophase carbon spheres (MCS), or carbonaceous micro-spheres (CMS). The presently disclosed mechanical means or chemical means disrupt the formation of MCMBs.

Several methods have been used for isolation of individual graphene planes or graphene domains from other components in a heat-treated mass of PAHs or pitch. These include solvent extraction, emulsification, centrifugal separation, and pressurized filtration. Using solvent extraction as an example, the heat treated mass containing these graphene sheets or domains may be first selectively dissolved in quinoline, pyridine, or an aromatic oil such as anthracene oil, solvent naptha, or the like, with the graphene sheets or graphene domains being suspended as an insoluble component. The insoluble component in the resulting suspension is then isolated by solid-liquid separation to become isolated single-layer graphene sheets or few-layer graphene sheets.

Figure 1:
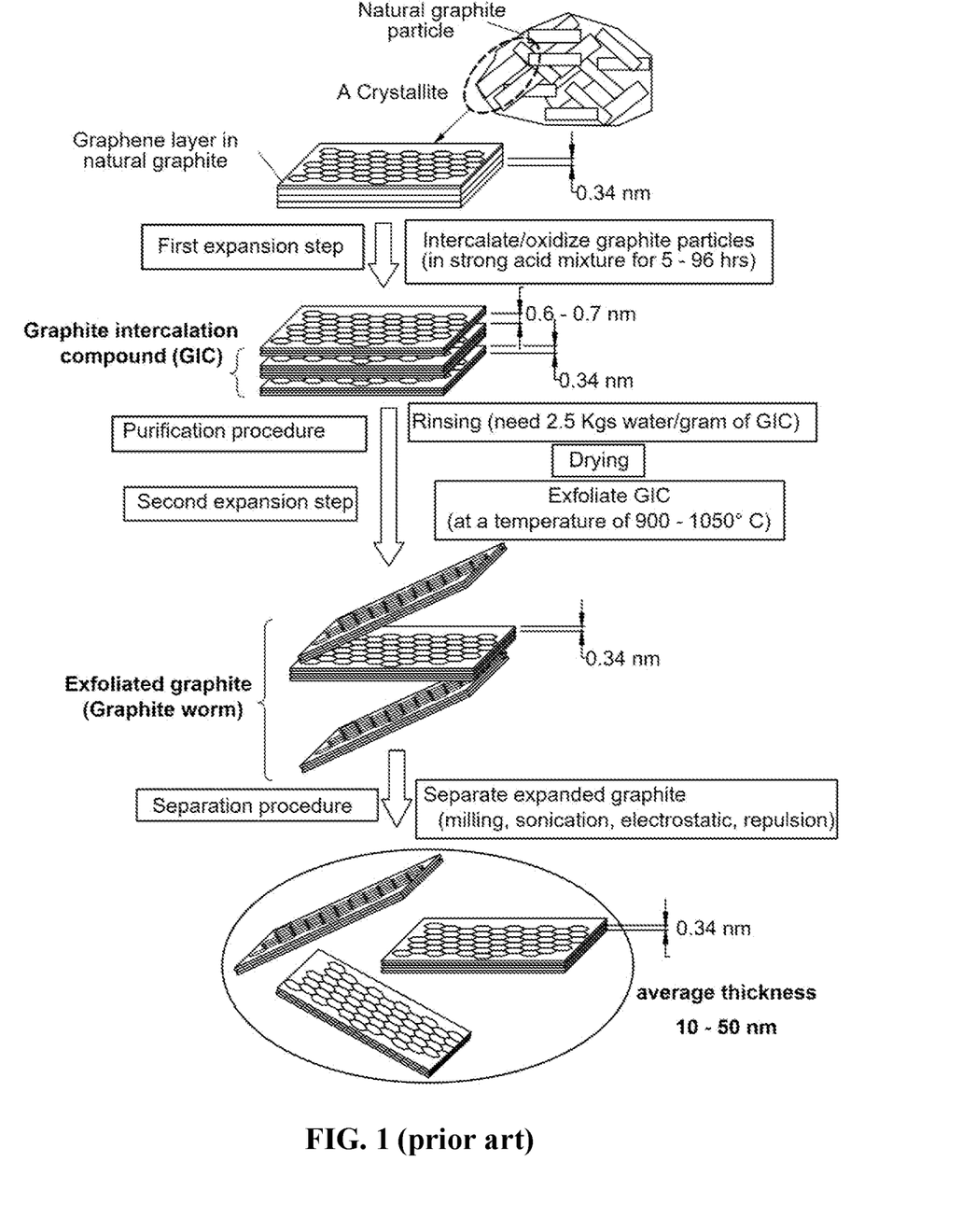
FIG. 1 A flow chart showing the most commonly used prior art process of producing highly oxidized NGPs that entails tedious chemical oxidation/intercalation, rinsing, and high-temperature exfoliation procedures.

As shown in FIG. 1, the prior art chemical processes of producing graphene (reduced graphene oxide) from natural graphite typically involve immersing graphite powder in a mixture of concentrated sulfuric acid, nitric acid, and an oxidizer, such as potassium permanganate or sodium perchlorate, forming a reacting mass that requires typically 5-120 hours to complete the chemical intercalation/oxidation reaction. Once the reaction is completed, the slurry is subjected to repeated steps of rinsing and washing with water and then subjected to drying treatments to remove water. The dried powder, referred to as graphite intercalation compound (GIC) or graphite oxide (GO), is then subjected to a thermal shock treatment. This can be accomplished by placing GIC in a furnace pre-set at a temperature of typically 800-1100° C. (more typically 950-1050° C.). The resulting products are typically highly oxidized graphene (i.e. graphene oxide with a high oxygen content), which must be chemically or thermal reduced to obtain reduced graphene oxide (RGO). RGO is found to contain a high defect population and, hence, is not as conducting as pristine graphene. We have observed that that the pristine graphene paper (prepared by vacuum-assisted filtration of pristine graphene sheets) exhibit electrical conductivity values in the range of 1,500-4,500 S/cm. In contrast, the RGO paper prepared by the same paper-making procedure typically exhibits electrical conductivity values in the range of 100-1,000 S/cm.

It is again critically important to recognize that the presently disclosed process not only avoids significant chemical usage, but also produces a higher quality final product—pristine graphene as opposes to thermally reduced graphene oxide, as produced by the prior art process. Pristine graphene enables the creation of materials with higher electrical and thermal conductivity.

The revolutionary process of the present disclosed appears to essentially eliminate the required functions of graphene plane expansion, intercalant penetration, exfoliation, and separation of graphene sheets and replace it with an entirely mechanical exfoliation process. The entire process can take less than 5 hours, and can be done with no added chemicals. This is absolutely stunning, a shocking surprise to even those top scientists and engineers or those of extraordinary ability in the art.

The presently disclosed process is capable of producing single-layer graphene sheets. In many examples, the graphene material produced contains at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content no less than 95% by weight, or functionalized graphene.

The presently disclosed process does not involve the production of GIC and, hence, does not require the exfoliation of GIC at a high exfoliation temperature (e.g. 800-1, 100° C.). This is another major advantage from environmental protection perspective. The prior art processes require the preparation of dried GICs containing sulfuric acid and nitric acid intentionally implemented in the inter-graphene spaces and, hence, necessarily involve the decomposition of $H_2SO_4$ and $HNO_3$ to produce volatile gases (e.g. $NO_x$ and $SO_x$) that are highly regulated environmental hazards. The presently disclosed process completely obviates the need to decompose $H_2SO_4$ and $HNO_3$ and, hence, is environmentally benign. No undesirable gases are released into the atmosphere during the combined graphite expansion/exfoliation/separation process of the present disclosure.

Chemical means are herein discussed in more detail. The carbon atoms at the edge planes of PAHs are reactive and must contain some heteroatom or group to satisfy carbon valency. Provided that certain chemical species, containing desired chemical functional groups (e.g. —$NH_2$, Br—, etc.), are included in the heat-treated mass of PAHs or pitch, these functional groups can be imparted to graphene edges and/or surfaces. During the first heat treatment of aromatic molecules, chemical functional groups at the edge or on a plane surface of incipient graphene planes also prevent close stacking of these planes; making it easier to isolate individual graphene sheets from the non-graphene matrix. The chemical means include functionalizing or derivatizing at least one of the planes of hexagonal carbon atoms or fused aromatic rings. These planes are incipient or precursor to graphene planes.

In other words, production and chemical functionalization of graphene sheets can be accomplished concurrently by including appropriate chemical compounds in the heat-treatment mass. In summary, a major advantage of the present disclosure over other processes is the simplicity of simultaneous production and modification of surface chemistry.

Graphene platelets derived by this process may be functionalized through the inclusion of various chemical species in the heat-treatment mass. In each group of chemical species discussed below, we selected 2 or 3 chemical species for functionalization studies.

In one preferred group of chemical agents, the resulting functionalized NGP may broadly have the following formula(e): [NGP]—$R_m$, wherein m is the number of different functional group types (typically between 1 and 5), R is selected from $SO_3H$, COOH, $NH_2$, OH, R'CHOH, CHO, CN, COCl, halide, COSH, SH, COOR', SR', $SiR'_3$, Si(—(OR'—)$_y$R'$_{3-y}$, Si(—O—SiR'$_2$—)OR', R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate.

For NGPs to be effective reinforcement fillers in epoxy resin, the function group —$NH_2$ is of particular interest. For example, a commonly used curing agent for epoxy resin is diethylenetriamine (DETA), which has three —$NH_2$ groups. If DETA is included in the impacting chamber, one of the three —$NH_2$ groups may be bonded to the edge or surface of a graphene sheet and the remaining two un-reacted —$NH_2$ groups will be available for reacting with epoxy resin later. Such an arrangement provides a good interfacial bonding between the NGP (graphene sheets) and the matrix resin of a composite material.

Other useful chemical functional groups or reactive molecules may be selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), hexamethylenetetramine, polyethylene polyamine, polyamine epoxy adduct, phenolic hardener, non-brominated curing agent, non-amine curatives, and combinations thereof. These functional groups are multi-functional, with the capability of reacting with at least two chemical species from at least two ends. Most importantly, they are capable of bonding to the edge or surface of graphene using one of their ends and, during subsequent epoxy curing stage, are able to react with epoxide or epoxy resin at one or two other ends.

The above-described [NGP]—$R_m$ may be further functionalized. This can be conducted by opening up the lid of an impacting chamber after the —$R_m$ groups have been attached to graphene sheets and then adding the new functionalizing agents to the impacting chamber and resuming the impacting operation. The resulting graphene sheets or platelets include compositions of the formula: [NGP]-$A_m$, where A is selected from OY, NHY, O=C—OY, P=C—NR'Y, O=C—SY, O=C—Y, —CR'l-OY, N'Y or C'Y, and Y is an appropriate functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, R'N$^+$(R')$_3$X$^-$, R'$SiR'_3$, R'Si(—OR'—)$_y$R'$_{3-y}$, R'Si (—O—SiR'$_2$—)OR', R'—R", R'—N—CO, $(C_2H_4O—)_wH$, (—$C_3H_6O$—)$_w$H, (—$C_2H_4O)_w$—R', $(C_3H_6O)_w$—R', R', and w is an integer greater than one and less than 200.

The NGPs may also be functionalized to produce compositions having the formula: [NGP]—[R'-A]$_m$, where m, R' and A are as defined above. The compositions of the disclosed process also include NGPs upon which certain cyclic compounds are adsorbed. These include compositions of matter of the formula: [NGP]—[X—$R_a$]$_m$, where a is zero or a number less than 10, X is a polynuclear aromatic, polyheteronuclear aromatic or metallopolyheteronuclear aromatic moiety and R is as defined above. Preferred cyclic compounds are planar. More preferred cyclic compounds for adsorption are porphyrins and phthalocyanines. The adsorbed cyclic compounds may be functionalized. Such compositions include compounds of the formula, [NGP]—[X-$A_a$]$_m$, where m, a, X and A are as defined above.

The functionalized NGPs of the instant disclosure can be prepared by sulfonation, electrophilic addition to deoxygenated platelet surfaces, or metallation. The graphitic platelets can be processed prior to being contacted with a functionalizing agent. Such processing may include dispersing the platelets in a solvent. In some instances the platelets may then be filtered and dried prior to contact. One particularly useful type of functional group is the carboxylic acid moieties, which naturally exist on the surfaces of NGPs if they are prepared from the acid intercalation route discussed earlier. If carboxylic acid functionalization is needed, the NGPs may be subjected to chlorate, nitric acid, or ammonium persulfate oxidation.

Carboxylic acid functionalized graphitic platelets are particularly useful because they can serve as the starting point for preparing other types of functionalized NGPs. For example, alcohols or amides can be easily linked to the acid to give stable esters or amides. If the alcohol or amine is part of a di- or poly-functional molecule, then linkage through the O- or NH-leaves the other functionalities as pendant groups. These reactions can be carried out using any of the methods developed for esterifying or aminating carboxylic acids with alcohols or amines as known in the art. Examples of these methods can be found in G. W. Anderson, et al., J. Amer. Chem. Soc. 96, 1839 (1965), which is hereby incorporated by reference in its entirety. Amino groups can be introduced directly onto graphitic platelets by treating the platelets with nitric acid and sulfuric acid to obtain nitrated platelets, then chemically reducing the nitrated form with a reducing agent, such as sodium dithionite, to obtain amino-functionalized platelets.

The following examples serve to provide the best modes of practice for the presently disclosed process and should not be construed as limiting the scope of the process:

Example 1: Isolated Graphene Sheets from Chlorinated Naphthalene

Isolated graphene sheets were produced from heat treated chlorinated naphthalene (2,3,6,7-Tetrachloronaphthalene) by executing the following procedure: (a) pouring a mass of chlorinated naphthalene (5 g), chlorophenylene (5 g), and 0.1 g of $PdCl_2$ catalyst into a stainless steel reactor (5 gallon size); (b) heating the reactor from 25° C. to 150° C. at a rate of 2 degrees per minute and subsequently maintaining the temperature at 150° C. for 4 hours to obtain larger polycyclic aromatic molecules; (c) heat-treating these molecules at a temperature of 500° C. under mechanical shearing conditions (shear rate>100 $sec^{-1}$) to obtain individual graphene planes and graphene domains well-dispersed in a disordered matrix of carbon or hydrocarbon molecules, and (d) pouring 0.2 gallons of quinolone into the heat-treated mass to dissolve the disordered hydrocarbon molecules, allowing graphene sheets or graphene domains to be suspended as an insoluble component in the quinolone liquid. The insoluble component in the resulting suspension is then isolated by solid-liquid separation (filtration) to become isolated single-layer graphene sheets or few-layer graphene sheets.

Comparative Example 1: NGP Via Hummer's Process

Graphite oxide as prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 A). This material was subsequently transferred to a furnace pre-set at 650° C. for 4 minutes for exfoliation and heated in an inert atmosphere furnace at 1200° C. for 4 hours to create a low density powder comprised of few-layer reduced graphene oxide (RGO). Surface area was measured via nitrogen adsorption BET.

The RGO sheets were made into a disc of RGO paper 1 mm thick using a vacuum-assisted filtration procedure. The electrical conductivity of this disc of RGO paper was measured using a 4-point probe technique. The conductivity of this RGO disc was found to be approximately 550 S/cm. In contrast, the graphene paper discs made from the graphene sheets using the presently disclosed process exhibits an electrical conductivity in the range of 1,500 to 4,500 S/cm. The differences are quite significant.

Example 2: Functionalized Graphene Sheets from Halogenated Anthracene

A mass (10 grams) of brominated anthracene was added into a stainless steel reactor, which was heated from 25° C. to a temperature of 145° C., which was subsequently maintained at the same temperature for 3 hours. On a separate basis, 2'-chloro-1,1':4',1"-terphenyl was added into a stainless steel reactor, which was heated from 25° C. to a temperature of 145° C., which was subsequently maintained at the same temperature for 12 hours in the presence of a catalyst, $PdCl_2$. Both procedures led to the formation of larger polycyclic hydrocarbons.

Subsequently, diethylenetriamine (DETA) was added separately into both reactors and the material mixture was processed at 450° C. for an additional 2 hours to obtain amine-functionalized graphene planes and graphene domains well-dispersed in a disordered matrix of hydrocarbon molecules. In an additional experiment, the final heat treatment temperature was raised to 1,500° C. and maintained at this temperature for 2 hours. This treatment resulted in the formation of longer/wider graphene sheets.

In separate experiments, the following functional group-containing species were separately introduced to the aromatic mass being heat-treated at up to 450° C.: an amino acid, sulfonate group (—$SO_3H$), 2-Azidoethanol, polyamide (caprolactam), and aldehydic group. In general, these functional groups were found to impart significantly improved interfacial bonding between resulting graphene sheets and epoxy, polyester, polyimide, and vinyl ester matrix materials to make stronger polymer matrix composites. The interfacial bonding strength was semi-quantitatively determined by using a combination of short beam shear test and fracture surface examination via scanning electronic microscopy (SEM). Non-functionalized graphene sheets tend to protrude out of the fractured surface without any residual matrix resin being attached to graphene sheet surfaces. In contrast, the fractured surface of composite samples containing functionalized graphene sheets do not exhibit any bare graphene sheets; any of what appears to be graphene sheets were completely embedded in a resin matrix.

Example 3: Isolated Graphene Sheets from Other Halogenated Polycyclic Aromatic Hydrocarbon Molecules Various halogenated PAHs were used as a starting material for producing graphene through the presently disclosed method. The representative processing conditions and products are summarized in Table 1 below:

TABLE 1

Representative processing conditions and some salient features of products (Cl—means chlorinated; Br—means brominated; F—means fluorinated.

| Sample ID | Halogenated aromatic molecules | $1^{st}$ heat treatment and catalyst (if any) | $2^{nd}$ heat treatment | Chemical or mechanical | Graphene type; length/width |
|---|---|---|---|---|---|
| Ph-1 | Chlorinated Phenanthrene | 150° C. 2 h ($PdCl_2$) + 300° C. 3 h | 600° C., 3 h | None | Few-layer; 1.5-22 μm |

TABLE 1-continued

Representative processing conditions and some salient features of products (Cl—means chlorinated; Br—means brominated; F—means fluorinated.

| Sample ID | Halogenated aromatic molecules | 1st heat treatment and catalyst (if any) | 2nd heat treatment | Chemical or mechanical | Graphene type; length/width |
|---|---|---|---|---|---|
| Ph-2 | Chlorinated Phenanthrene | 150° C. 2h (PdCl$_2$) + 300° C. 3 h | None | None | Few-layer; 0.23-0.45 μm |
| Ph-3 | Chlorinated Phenanthrene | 150° C. 2 h + 300° C. 3 h | 600° C., 3 h | None | Few-layer; 0.3-2.5 μm |
| Tc-1 | Br-Tetracene | 125° C. 2 h (FeCl$_3$) + 300° C. 3 h | 900° C., 3 h | High shear | Single-layer; 1.5-4.6 μm |
| Tc-2 | Br-Tetracene | 125° C. 2 h + 300° C. 3 h | 900° C. 3 h | None | 7-20 layers |
| Tc-3 | Br-Tetracene | 125° C. 2 h (FeCl$_3$) + 300° C. 3 h | None | High-shear | Single-layer; 0.35-0.66 μm |
| Py-1 | Cl-Pyrene | 150° C. 5 h (PdCl$_2$) + functionalization | 600° C., 3 h | Aryl silane | Single-layer |
| Py-2 | Cl-Pyrene | 150° C. 5 h (PdCl$_2$) | 600° C., 3 h | None | 5-10 layers |
| Cn-1 | Cl-Coronene | 450° C. 5 h | None | 2-Azidoethanol | Single-layer |
| Cn-2 | Cl-Coronene | 450° C. 5 h | None | None | 7-13 layers |
| PP-1 | Br-Petroleum pitch | 150° C. 2 h | 450° C. 3 h | Ultrasonication | Few-layer |
| PP-2 | Br-Petroleum pitch | 150° C. 2 h | 450° C. 3 h | None | Mesophase spheres |
| CP-1 | Cl-Coal tar pitch | 350° C. 2 h (FeCl$_3$) | 900° C. 3 h | Ultrasonication | Few-layer: 3.3-25 μm |
| CP-2 | Cl-Coal tar pitch | 350° C. 2 h (FeCl$_3$) | None | Ultrasonication | Few-layer; 0.3-2.5 μm |
| CP-3 | Cl-Coal tar pitch | 350° C. 2 h | None | None | Mesophase spheres |
| Tp + An-1 | Cl-triphenylene + F-anthracene | 300° C. 2 h | 1,500° C. 2 h | None | Few-layer; 5.3-35 μm |
| Tp − An-2 | Cr-triphenylene + F-anthracene | 300° C. 2 h | 500° C. 2 h | None | Few-layer; 1.3-2.2 μm |

These data indicate that, upon completion of the first heat treatment, the longer/wider aromatic molecules can be further increased in length and width if the material is subjected to a second heat treatment at a higher temperature. Halogenation, along with some catalyst, can promote ring-fusing of polycyclic aromatic molecules to form larger aromatic molecules that are essentially incipient graphene molecules.

All the halogenated PAHs herein investigated (e.g. halogenated versions of naphthalene, anthracene, phenanthrene, tetracene, chrysene, triphenylene, pyrene, pentacene, benzopyrene, corannulene, benzo-perylene, coronene, ovalene, and benzo-fluorene) can be methylated, aminated (derivatized with amine), hydroxylated, etc. to obtain derivatives having a substituent on a ring structure thereof. All the derivatives of these PAHs can be used as a starting material for practicing instant disclosed process to produce graphene.

As an example of the derivative of a PAH, chemical oxidation of anthracene occurs readily in the presence of, for example, hydrogen peroxide and vanadyl acetylacetonate, giving anthraquinone, $C_{14}H_8O_2$, shown below:

These two O atoms are highly active and can readily react with a broad array of chemical species, such as those selected from —SO$_3$H, —COOH, —NH$_2$, —OH, —R'CHOH, —CHO, —CN, —COCl, halide, —COSH, —SH, —COOR', —SR', —SiR'$_3$, Si(—OR'—)$_y$R'$_3$-y, Si(—O—SiR'$_2$—)OR', R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate. Essentially, all the derivatives of PAHs can be used as a starting material for the production of graphene materials using the presently disclosed method.

The presently disclosed method is simple, fast, cost-effective, and generally does not make use of undesirable chemicals. This is quite surprising, considering the fact that previous researchers and manufacturers have focused on more complex, time intensive and costly methods to produce graphene in industrial quantities from graphite. In other words, it has been generally believed that production of graphene requires chemical intercalation and oxidation of carbon or graphite materials using undesirable chemicals, such as sulfuric acid and potassium permanganate. The presently disclosed process defies this expectation in many ways:

(1) Unlike the chemical intercalation and oxidation of natural or synthetic graphite (which requires expansion of inter-graphene spaces, further expansion or exfoliation of graphene planes, and full separation of exfoliated graphene sheets), the instant method stops graphene planes from being stacked and merged to become graphite. These graphene planes are isolated to recover graphene sheets before they become part of a graphite material.

(2) The graphene sheets being free of oxidation damage allow for creation of graphene-containing products with higher electrical and thermal conductivity.

(3) Unlike prior art bottom up production methods, large continuous graphene sheets can be produced with the instant method. As discussed earlier, Yang, et al. ["Two-dimensional Graphene Nano-ribbons," J. Am. Chem. Soc. 130 (2008) 4216-17] synthesized nano graphene sheets with lengths of only up to 12 nm from small molecules. The present method typically produces graphene sheets from 200 nm to 100 μm (4) Contrary to common production methods, strong acids and oxidizers are not needed to produce graphene.

(5) Contrary to common production methods, a washing process requiring substantial amounts of water is not needed. The presently disclosed process is significantly more environmentally benign.

(6) A wide variety of halogenated polycyclic aromatic hydrocarbons and their derivatives can be used as a starting material for producing graphene via the presently disclosed method. All the petroleum or coal pitch materials can be used as a starting material as well.

The invention claimed is:

1. A method of producing isolated graphene sheets, said method comprising:
   a) providing a mass of halogenated aromatic molecules in a solid, or semi-solid state wherein said halogenated aromatic molecules are selected from halogenated variants of petroleum heavy oil or pitch, coal tar pitch, a polynuclear hydrocarbon, and combinations thereof, wherein said halogenated variants of polynuclear hydrocarbon are selected from halogenated variants of naphthalene, phenanthrene, chrysene, triphenylene, corannulene, benzo-perylene, coronene, ovalene, benzo-fluorene, a derivative thereof having a substituent on a ring structure thereof, a chemical derivative thereof, and combinations thereof;
   b) heat treating said mass of halogenated aromatic molecules at a first temperature selected from 25° C. to 3,000° C. so that said halogenated aromatic molecules are merged or fused into larger aromatic molecules and optionally heat-treating said larger molecules at a second temperature, higher than the first temperature, selected from 300° C. to 3,200° C., to form graphene domains dispersed in a disordered matrix of carbon or hydrocarbon molecules, wherein said graphene domains are each composed of from 1 to 30 planes of hexagonal carbon atoms or fused aromatic rings having a length or width from 5 nm to 35 μm and, in the situations wherein there are 2-30 planes in a graphene domain, having an inter-graphene space between two planes of hexagonal carbon atoms or fused aromatic rings no less than 0.34 nm;
   c) separating and isolating said planes of hexagonal carbon atoms or fused aromatic rings to recover graphene sheets from said disordered matrix; and
   d) conducting a chemical means to treat said halogenated aromatic molecules during or after said step (b), wherein said chemical means comprises adding a functionalizing agent into said mass of halogenated aromatic molecules and said halogenated aromatic molecules are chemically functionalized by said agent, wherein said functionalizing agent contains a functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, an acrylonitrile chain, polyfurfuryl alcohol, phenolic resin, and combinations thereof; and/or said functionalizing agent contains a functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R')$_3$X$^-$, R'SiR'$_3$, R'Si(—OR'—)$_y$R'$_{3-y}$, R'Si(—O—SiR'$_2$—)OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200;
   wherein said graphene sheet production and said chemical functionalization are accomplished concurrently.

2. The method of claim 1, wherein said graphene domains have a length or width from 10 nm to 10 μm or an inter-graphene space no less than 0.4 nm.

3. The method of claim 1, wherein said graphene domains have an inter-graphene space from 0.5 nm to 2.0 nm.

4. The method of claim 1, further including a step of functionalizing or derivatizing at least one of said planes of hexagonal carbon atoms or fused aromatic rings during or after said step (b).

5. The method of claim 1, wherein said graphene sheets comprise single-layer graphene, double-layer graphene, or triple-layer graphene sheets.

6. A method of producing isolated graphene sheets, said method comprising:
   a) providing a mass of halogenated aromatic molecules in a liquid, solid, or semi-solid state wherein said halogenated aromatic molecules are selected from halogenated variants of petroleum heavy oil or pitch, coal tar pitch, a polynuclear hydrocarbon, and combinations thereof;
   b) heat treating said mass of halogenated aromatic molecules at a first temperature selected from 25° C. to 3,000° C. so that said halogenated aromatic molecules are merged or fused into larger aromatic molecules and optionally heat-treating said larger molecules at a second temperature, higher than the first temperature, selected from 300° C. to 3,200° C., to form graphene domains dispersed in a disordered matrix of carbon or hydrocarbon molecules, wherein said graphene domains are each composed of from 1 to 30 planes of hexagonal carbon atoms or fused aromatic rings having a length or width from 5 nm to 35 μm and, in the situations wherein there are 2-30 planes in a graphene domain, having an inter-graphene space between two planes of hexagonal carbon atoms or fused aromatic rings no less than 0.34 nm, and further comprising conducting a mechanical means on said halogenated aromatic molecules or said larger aromatic molecules during step (b) wherein said mechanical means is selected from exposing said mass of halogenated aromatic molecules to a gaseous environment, flowing fluid, sonic waves, mechanical shearing, and combinations thereof; and
   c) separating and isolating said planes of hexagonal carbon atoms or fused aromatic rings to recover graphene sheets from said disordered matrix.

7. The method of claim 1, wherein said graphene sheets contain at least 80% single-layer graphene or at least 80% few-layer graphene having no greater than 10 graphene planes.

8. The method of claim 1, wherein said graphene sheets contain pristine graphene, oxidized graphene with less than 5% oxygen content by weight, graphene fluoride, graphene fluoride with less than 5% fluorine by weight, graphene with a carbon content no less than 95% by weight, or chemically modified graphene.

9. The method of claim 1, wherein said functionalizing agent contains a chemical functional group selected from alkyl or aryl silane, alkyl or aralkyl group, hydroxyl group, carboxyl group, amine group, sulfonate group (—SO$_3$H), aldehydic group, quinoidal, fluorocarbon, and combinations thereof.

10. The method of claim 1, wherein said functionalizing agent contains an azide compound selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups, -continued and combinations thereof.

11. The method of claim 1, wherein said functionalizing agent contains an oxygenated group selected from the group consisting of hydroxyl, peroxide, ether, keto, and aldehyde.

12. The method of claim 1 wherein said functionalizing agent contains a functional group selected from the group consisting of SO$_3$H, COOH, NH$_2$, OH, R'CHOH, CHO, CN, COCl, halide, COSH, SH, COOR', SR', SiR'$_3$, Si(—OR'—)$_y$R'$_{3-y}$, Si(—O—SiR'$_2$—) OR', R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

13. The method of claim 1, wherein said graphene domains have a length or width from 5 nm to 35 μm or an inter-graphene space no less than 0.4 nm.

14. A method of producing isolated graphene sheets, said method comprising:
   a) providing a mass of halogenated aromatic molecules in a liquid, solid, or semi-solid state wherein said halogenated aromatic molecules are selected from halogenated variants of petroleum heavy oil or pitch, coal tar pitch, a polynuclear hydrocarbon, and combinations thereof;
   b) heat treating said mass of halogenated aromatic molecules at a first temperature selected from 25° C. to 3,000° C. so that said halogenated aromatic molecules are merged or fused into larger aromatic molecules and optionally heat-treating said larger molecules at a second temperature, higher than the first temperature, selected from 300° C. to 3,200° C., to form graphene domains dispersed in a disordered matrix of carbon or hydrocarbon molecules, wherein said graphene domains are each composed of from 1 to 30 planes of hexagonal carbon atoms or fused aromatic rings having a length or width from 5 nm to 35 μm and, in the situations wherein there are 2-30 planes in a graphene domain, having an inter-graphene space between two planes of hexagonal carbon atoms or fused aromatic rings no less than 0.34 nm; and
   c) separating and isolating said planes of hexagonal carbon atoms or fused aromatic rings to recover graphene sheets from said disordered matrix, wherein said step of separating and isolating includes solvent extraction or supercritical fluid extraction of said planes of hexagonal carbon atoms or fused aromatic rings from said disordered matrix to form said graphene sheets.

15. The method of claim 14, wherein said supercritical fluid includes carbon dioxide.

16. A method of producing isolated graphene sheets, said method comprising:
   a) providing a mass of halogenated aromatic molecules in a liquid, solid, or semi-solid state wherein said halogenated aromatic molecules are selected from halogenated variants of petroleum heavy oil or pitch, coal tar pitch, a polynuclear hydrocarbon, and combinations thereof;

b) heat treating said mass of halogenated aromatic molecules at a first temperature selected from 25° C. to 3,000° C. so that said halogenated aromatic molecules are merged or fused into larger aromatic molecules and optionally heat-treating said larger molecules at a second temperature, higher than the first temperature, selected from 300° C. to 3,200° C., to form graphene domains dispersed in a disordered matrix of carbon or hydrocarbon molecules, wherein said graphene domains are each composed of from 1 to 30 planes of hexagonal carbon atoms or fused aromatic rings having a length or width from 5 nm to 35 μm and, in the situations wherein there are 2-30 planes in a graphene domain, having an inter-graphene space between two planes of hexagonal carbon atoms or fused aromatic rings no less than 0.34 nm; and c) separating and isolating said planes of hexagonal carbon atoms or fused aromatic rings to recover graphene sheets from said disordered matrix, wherein said step (c) includes a step of dissolving, melting, etching, vaporizing, subliming, burning off, or ultrasonicating said disordered matrix material for separating said graphene sheets.

17. The method of claim 16, wherein said graphene domains have a length or width from 5 nm to 35 μm or an inter-graphene space no less than 0.4 nm.

* * * * *